(12) United States Patent
Meyers (10) Patent No.: US 11,603,482 B2
(45) Date of Patent: Mar. 14, 2023

(54) POLYMER BONDING PROCESS

(71) Applicant: Donald W. Meyers, Newark, OH (US)

(72) Inventor: Donald W. Meyers, Newark, OH (US)

( * ) Notice: Subject to any disclaimer, the term of this patent is extended or adjusted under 35 U.S.C. 154(b) by 0 days.

(21) Appl. No.: 17/337,083

(22) Filed: Jun. 2, 2021

(65) Prior Publication Data
US 2021/0395572 A1 Dec. 23, 2021

Related U.S. Application Data

(63) Continuation-in-part of application No. 16/739,319, filed on Jan. 10, 2020, and a continuation-in-part of application No. 15/918,983, filed on Mar. 12, 2018, now Pat. No. 10,577,521.

(51) Int. Cl.
*C09J 5/04* (2006.01)
*C09J 4/00* (2006.01)

(52) U.S. Cl.
CPC .. *C09J 5/04* (2013.01); *C09J 4/00* (2013.01)

(58) Field of Classification Search
CPC ........ C09J 4/00; C09J 5/04; C09J 5/02; B29C 73/10
USPC ..................................................... 156/94, 98
See application file for complete search history.

(56) References Cited

U.S. PATENT DOCUMENTS

| 4,460,759 A | 7/1984 | Robins | |
| 10,577,521 B2 * | 3/2020 | Meyers | B32B 25/14 |
| 2019/0275771 A1 * | 9/2019 | Meyers | B32B 25/08 |

FOREIGN PATENT DOCUMENTS

| EP | 3202954 A1 * | 8/2017 | B29C 65/48 |
| GB | 2475352 A * | 5/2011 | B29C 73/10 |

* cited by examiner

*Primary Examiner* — John L Goff, II
(74) *Attorney, Agent, or Firm* — Bryce D. Miracle, Esq.; MIP Legal, Ltd.

(57) ABSTRACT

The present application provides methods and compositions for patching a polymer or a non-polymer substrate surface by producing a bond between a polymer patch surface and the substrate surface. The application also provides kits having instructions for patching a polymer or a non-polymer substrate surface by producing a bond between a polymer patch surface and the substrate surface.

1 Claim, 10 Drawing Sheets

POLYMER BONDING PROCESS

CROSS-REFERENCE TO RELATED APPLICATIONS

This application is a continuation-in-part of U.S. Non-Provisional patent application Ser. No. 16/739,319 which is a divisional of U.S. Non-Provisional patent application Ser. No. 15/918,983, now U.S. Pat. No. 10,577,521, which claims priority to U.S. Provisional Patent Application No. 62/601,060 entitled "Polymer Bonding Process" filed Mar. 10, 2017, the entire disclosure of each is hereby incorporated herein by reference.

FIELD OF INVENTION

The present invention relates to the field of compositions and methods, particularly a method and kit for affixing a polymer patch to a polymer or non-polymer substrate surface.

BACKGROUND

A polymer is a substance or material consisting of very large molecules, or macromolecules, composed of many repeating subunits. Due to their broad spectrum of properties, both synthetic and natural polymers play essential and ubiquitous roles in everyday life. Polymers range from familiar synthetic plastics such as polystyrene to natural biopolymers such as DNA and proteins that are fundamental to biological structure and function. Polymers, both natural and synthetic, are created via polymerization of many small molecules, known as monomers. Their consequently large molecular mass, relative to small molecule compounds, produces unique physical properties including toughness, high elasticity, viscoelasticity, and a tendency to form amorphous and semicrystalline structures rather than crystals.

The term polymer is often used to describe plastics, which are synthetic polymers. A wide variety of synthetic polymers are available. Some familiar household synthetic polymers include: Nylons in textiles and fabrics, Teflon in non-stick pans, Bakelite for electrical switches, polyvinyl chloride (PVC) in pipes, etc. Popular polymers for manufacturing include polyethylene and polypropylene.

Often times synthetic polymers break or fracture which require some type of repair, for example, auto plastic often requires some type of repair after an accident or a plastic household decor item will need repair after a fall. Currently, the only means of repair is by way of adhesives or glues which provide a limited, temporary glue joint between the polymer surfaces. The adhesive does not provide an actual chemical bond between the surfaces of the polymer or to the glue itself. The glue molecules simply stick to the polymer surface molecules in order to provide the connection—thereby limiting the strength and longevity of the bond.

SUMMARY

The present application provides methods and compositions for patching a polymer or a non-polymer substrate surface by producing a bond between a polymer patch surface and the substrate surface. The application also provides kits having instructions for patching a polymer or a non-polymer substrate surface by producing a bond between a polymer patch surface and the substrate surface.

In a version of the application, a method of patching a polymer substrate surface by producing a bond between a polymer patch surface and the polymer substrate surface generally comprises the steps of: roughing the polymer substrate surface; cleaning the polymer substrate surface; applying a synthetic polymer preparation solution to the polymer substrate surface; allowing the applied synthetic polymer preparation solution to dry; applying a polymerization catalyst to the polymer substrate surface; allowing the applied polymerization catalyst to dry; applying heat to warm the polymer substrate surface until surface temperatures reach between about 114°-120° Fahrenheit; applying a surface insensitive cyanoacrylate structural adhesive to the polymer patch surface; and urging contact between the polymer patch surface and the polymer substrate surface.

In another version of the application, a method of patching a non-polymer substrate surface by producing a bond between a polymer patch surface defined within a perimeter and a non-polymer substrate surface is disclosed. The method generally comprising the steps of: roughing the non-polymer substrate surface; polishing the non-polymer substrate surface; cleaning the non-polymer substrate surface; applying a polymerization catalyst to the non-polymer substrate surface; allowing the applied polymerization catalyst to dry; applying a first amount of surface insensitive cyanoacrylate structural adhesive to the polymer patch surface; and urging contact between the polymer patch surface and the non-polymer substrate surface.

In yet another version of the application, a method of patching a non-polymer substrate surface by producing a bond between a polymer patch surface defined within a perimeter, an intermediate reinforcement substrate having a first surface and a second opposing surface, and the non-polymer substrate surface is disclosed. The method generally comprises the steps of: roughing the non-polymer substrate surface; polishing the non-polymer substrate surface; roughing the first surface and the second surface of the intermediate reinforcement substrate; cleaning the non-polymer substrate surface, the first surface of the intermediate reinforcement substrate, and the second surface of the intermediate reinforcement substrate; applying a polymerization catalyst to the non-polymer substrate surface; allowing the applied polymerization catalyst applied to the non-polymer substrate surface to dry; applying a surface insensitive cyanoacrylate structural adhesive to the intermediate reinforcement substrate first surface; urging contact between the intermediate reinforcement substrate first surface and the non-polymer substrate surface; applying a polymerization catalyst to the intermediate reinforcement substrate second surface; allowing the applied polymerization catalyst applied to the intermediate reinforcement substrate second surface to dry; applying a surface insensitive cyanoacrylate structural adhesive to the polymer patch surface; and urging contact between the polymer patch surface, the intermediate reinforcement substrate second surface and the surrounding exposed non-polymer substrate surface.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

In the following description, for purposes of explanation and not limitation, specific details are set forth such as particular compositions, kits, methods, techniques, etc. in order to provide a thorough understanding of the present invention. However, it will be apparent to those skilled in the art that the present invention may be practiced in other versions that depart from these specific details. In other instances, detailed descriptions of well-known devices and methods are omitted so as not to obscure the description of the present invention with unnecessary detail.

Moreover, the description is not to be taken in the limiting sense but is made merely for the purpose of illustrating the general principles of the invention, since the scope of the invention is best defined by the appended claims. Various inventive features and methods are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

The term "polymer" or "synthetic polymer" as used herein refers primarily to synthetic, oil-based polymers, co-polymers and polyolefins, known as poly-plastics. Plastics are typically produced by the conversion of natural products or by the synthesis from primary chemicals generally coming from oil, natural gas, or coal. Relevant polyplastics may include low-density polyethylene (LDPE), high density polyethylene (HDPE), polypropylene (PP), Polyvinyl chloride (PVC) Polystyrene (PS), Nylon, Teflon (Polytetrafluoroethylene), Thermoplastic polyurethanes (TPU), Polytetrafluoroethylene (PTFE), Silicones, Polysiloxanes, etc. Relevant copolymers may include acrylonitrile butadiene styrene (ABS), styrene/butadiene co-polymer (SBR), nitrile rubber, styrene-acrylonitrile, styrene-isoprene-styrene (SIS) and ethylene-vinyl acetate as well as nylon.

The term "substrate" as used herein refers primarily to objects having all types of surface materials including polymers and non-polymers.

The term surface as used herein refers primarily to uppermost layer of an object that will be utilized in the bonding and polymerization process. Surfaces may have a smooth, rough or irregular profile. For example, the surfaces can be a smooth flat surface, an irregular rough surface, or displaying broken ridges including forming broken edges. Typically, the exposed surfaces formed by a break in a plastic or other substrate forms the relevant surfaces to be bonded.

The present application provides a method of use of chemical compositions and kits having instructions for using the chemical compositions for producing a permanent bond between a polymer-plastic surface and a substrate surface. A version of the application utilizes a synthetic polymer preparation solution to prepare the synthetic polymer surface for the bonding process, a polymerization catalyst as well a heating source for activating and accelerating the bonding process, and a cyanoacrylate adhesive for interacting with the synthetic polymer preparation solution and the polymerization catalyst for sustaining the permanent bond between surfaces.

The cyanoacrylate adhesive is utilized in the process to bond the synthetic polymer surface with the substrate surface. Generally, cyanoacrylates are a family of strong fast-acting adhesives with industrial, medical, and household uses. Cyanoacrylates include methyl 2-cyanoacrylate, ethyl-2-cyanoacrylate (commonly sold under trade names such as "Super Glue" and "Krazy Glue"™, of Toagosei), n-butyl cyanoacrylate and 2-octyl cyanoacrylate. Cyanoacrylate adhesives are sometimes known generically as instant glues, power glues or superglues. The abbreviation "CA" is commonly used for industrial grades. The active ingredient in cyanoacrylate adhesives is cyanoacrylate ester. Typical Cyanoacrylate adhesive compounds comprise 90-99% of cyanoacrylate ester.

Ideally, the cyanoacrylate adhesive is a surface insensitive adhesive which is formulated to react much faster than traditional CA's on inactive and active surfaces, even in dry climates, for a more consistent, reliable bond. This effect is magnified when a surface insensitive CA is used in combination with the synthetic polymer preparation solution and the polymerization catalyst. The speed and intensity of the polymerization process is critical to bond formation.

The synthetic polymer preparation solution is a chemical composition which prepares the poly-plastic surface for the bonding process. More specifically, the synthetic polymer preparation solution comprises chemical compounds which allow the achievement of high strength bonds when utilized in conjunction with cyanoacrylate adhesives. More specifically, the chemical compounds in the synthetic polymer preparation solution rapidly dries (relatively short flash off period) and removes oil from the poly-plastic surface and etches the surface. This etching of the surface provides increased and irregular shaped surface area which provides an ideal framework for the bonding process.

Generally, the synthetic polymer preparation solution is applied/saturated to the poly-plastic surfaces in the form of a spray, brush, and/or by dipping the surfaces. The synthetic polymer preparation solution treated surfaces are allowed to quickly and completely dry. Thereby, providing a poly-plastic surface that will yield a permanent, high strength bond that is resistant to aging and deterioration. It will be known that the synthetic polymer preparation solution treated poly-plastic surfaces do not have to be bonded immediately—the treated surfaces may be stored for significant periods of time including several years without losing the potential of providing a strong, permanent bond through the polymerization bonding process.

In a preferred version of the application, it is desirable that the synthetic polymer preparation solution provides a composition that has a quick "flash off" period in order to provide the best results. Through applicant's research and testing, preferably, the synthetic polymer preparation solution (PPS) is a solution comprising quantities of hydrotreated light naphtha, isopropanol, and triethylenediamine.

Ideally, the synthetic polymer preparation solution comprises 95%-99% hydrotreated light naphtha by volume. Naphtha is a flammable liquid hydrocarbon mixture and is known as Petroleum ether. It belongs to the product category of UVCB s-Organic. Naphtha is a group of various volatile, highly flammable, liquid hydrocarbon mixtures used chiefly as nonpolar solvents. Chemically, it is not an ether like diethyl ether, but a light hydrocarbon. Naphtha (petroleum), hydrotreated light is obtained from petroleum refineries as the portion of the distillate which is intermediate between the lighter naphtha and the heavier kerosene. Naphtha (petroleum), hydrotreated light consists mainly of pentane, and is sometimes used instead of pentane due to its lower cost.

For purposes of the application, the hydrotreated light naphtha assists with drying and providing a quick flash off of the treated surface while removing oils and carries and stabilizes the other active ingredients in the PPS, for example, the isopropanol and the triethylene diamine.

Preferably, the solution comprises 3-5% of isopropanol or isopropyl alcohol by volume which is a compound with the chemical formula $C_3H_8O$. Isopropyl alcohol is a colorless, flammable chemical compound with a strong odor. As an isopropyl group linked to a hydroxyl group, it is the simplest example of a secondary alcohol, where the alcohol carbon atom is attached to two other carbon atoms. It is a structural isomer of 1-propanol. The isopropyl compound is preferred because it is a solvent in regard to non-polar materials such as poly-plastics, thus when applied to the poly-plastic surface, the compound preferably etches the surface providing a superior surface structure framework for the bonding process.

Further, the preferred PPS comprises 0.1-1% of triethylenediamine which is an organic compound with the formula $N_2(C_2H_4)_3$, a highly nucleophilic amine, which is used as a catalyst and reagent in polymerization and organic synthesis. The triethylenediamine is an active ingredient in the PPS which provides a catalyst during the polymerization bonding process.

The polymerization catalyst is a chemical composition comprising an amine for activating, accelerating, and intensifying the polymerization bonding process of the cyanoacrylate adhesive. Preferably, the amine is N,N-Dimethyl-p-toluidine which has the chemical formula $C_9H_{13}N$ and is miscible with alcohol, ether, and chloroform as a carrier substance. Ideally, polymerization catalyst solution comprises 1-5% of the amine by volume, preferably about 3%.

The polymerization catalyst enhances the alkaline conditions on the treated surface in order to activate and accelerate the intensity of the polymerization of the cyanoacrylate adhesive or formation of covalent bonds. Thus, it is preferable that the polymerization catalyst is a cyanoacrylate activator and accelerator comprising an amine. Moreover, it is important to provide a polymerization catalyst because there is a limited window of time after the application of the cyanoacrylate adhesive to form a superior quantity of covalent bonds—the catalyst in conjunction with heat ensure that throughout this small timeframe, the maximum number of covalent bonds are formed, thereby yielding a strong, permanent bond after the process is complete.

Figure 1:
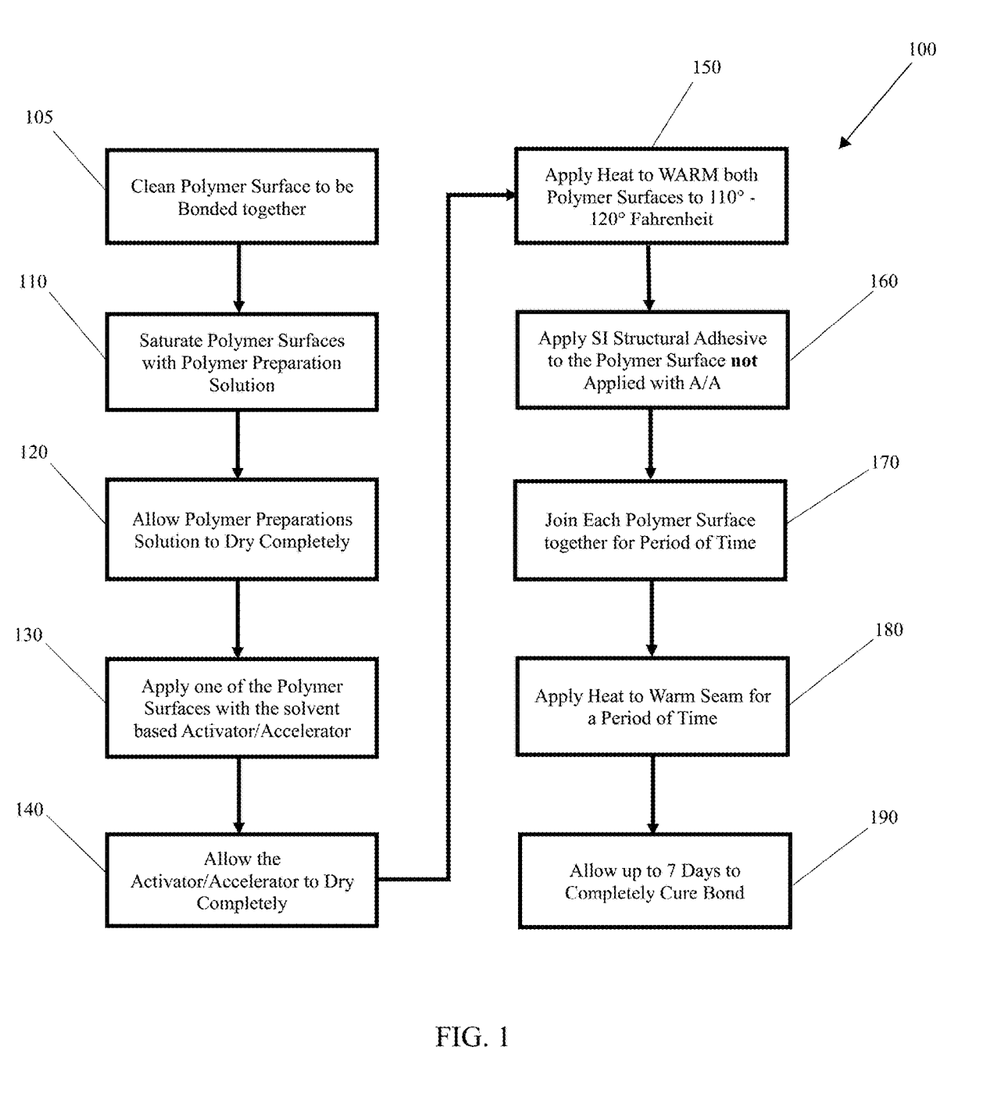
FIG. 1 is a flowchart of a version of the method of producing a permanent bond between a synthetic polymer first surface and a substrate second surface.
Figure 2:
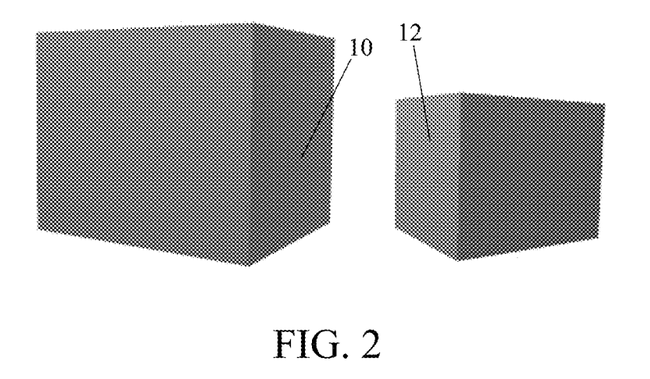
FIG. 2 is an illustrative perspective view providing an example of the synthetic polymer first surface and the substrate second surface before the applied method of bonding shown in FIG. 1.
Figure 3:
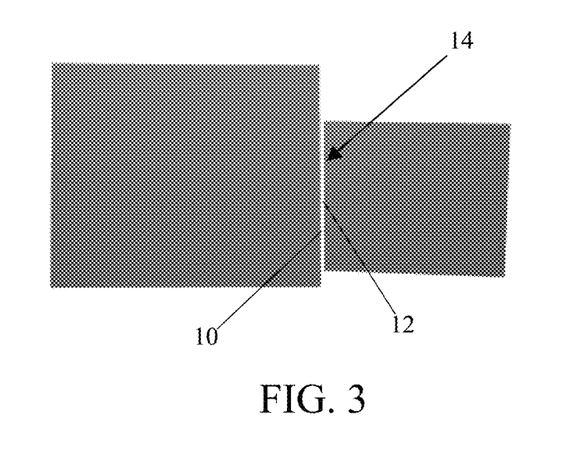
FIG. 3 is an illustrative perspective view providing an example of the synthetic polymer first surface and the substrate second surface after the applied method of bonding shown in FIG. 1.

Referring specifically now to FIG. 1-FIG. 3, the present application provides a method 100 of producing a permanent bond between a synthetic polymer first surface 10 and a substrate second surface 12. The method generally comprises the steps of: a) applying a synthetic polymer preparation solution to the synthetic polymer first surface 10 and, if the second substrate second surface 12 is a synthetic polymer, to the substrate second surface 12 (Step 110); b) allowing the applied synthetic polymer preparation solution to dry on each applied surface (Step 120); c) applying a polymerization catalyst to the synthetic polymer first surface 10 (Step 130); d) allowing the applied polymerization catalyst to dry on the synthetic polymer first surface 10 (Step 140); e) applying heat to warm the surfaces made of synthetic polymers until surface temperatures reach between about 114°-120° Fahrenheit (Step 150); f) applying a surface insensitive cyanoacrylate structural adhesive to the substrate second surface 12 which has not been treated with the polymerization catalyst (Step 160); g) urging contact between the first surface 10 and the second surface 12 (Step 170); and h) applying heat to warm the seam 14 formed between the first and second surface.

Preferably, prior to initiating the method 100, the synthetic polymer first surface 10 and the substrate second surface 12 is cleaned (step 105) in order to reduce quantities of foreign substances that could contaminate or mitigate the polymerization process. Cleaning may be performed by way of a moist paper towel or other means applied to the surfaces to remove dirt and grime. Any residual water on the surfaces is allowed to completely dry before beginning the method 100.

Referring to Step 110, the synthetic polymer preparation solution is applied only to the synthetic polymer surfaces to be bonded. Thus, the synthetic polymer preparation solution is not applied to non-poly plastic substrates, such as wood. The synthetic polymer preparation solution can be applied by way of spray bottle, brush, or even dipping the object surface into the solution. Once the synthetic polymer surfaces are completely saturated with PPS, the surfaces are allowed to completely dry (Step 120).

Thereafter, in step 130, the polymerization catalyst is applied to the synthetic polymer first surface 10 and not the substrate second surface 12. The polymerization catalyst can be applied by way of spray bottle, brush, or even dipping the object surface into the solution. Once the synthetic polymer first surface 10 is completely saturated with the polymerization catalyst, the surfaces are allowed to completely dry (Step 140).

Thereafter, in step 150, heat is evenly applied to warm the first and second surfaces 10, 12 until surface temperatures preferably reach 114°-120° Fahrenheit, more preferably about 118° Fahrenheit. The application of heat can be provided by a means for heating such as a blow dryer or heat gun. The application of heat primes each surface for the application of the SI adhesive and the bonding process at the molecular level. When heat is added to the surface of an object, the molecules and atoms vibrate faster. As atoms vibrate faster, the space between atoms increases. The result of increased molecular motion and greater spaces is the dramatic increase in the quantity, durability, and strength of resulting covalent bonds formed between the surfaces 10, 12. Thus, during the polymerization and bonding step 170, the heated surface provides a molecular excitation which dramatically increases the quantity, durability, and strength of resulting covalent bonds formed between the surfaces is increased. In essence, through testing, the addition of heat provides additional surface area which allows the bonds to react and form more quickly.

Temperatures exceeding 120° have been found through applicant's testing to cause the cyanoacrylate adhesive to polymerize prematurely. Applicant's testing has shown that surface temperatures falling below 110° fail to provide adequate molecular motion. Testing has shown that the ideal surface temperature prior to applying the SI cyanoacrylate adhesive and facilitating the bonding process is about 118°.

Referring to step 160 in FIG. 1, a cyanoacrylate structural adhesive, preferably a fast-active surface insensitive cyanoacrylate structural adhesive is applied to the substrate second surface 12 which has not been treated with the polymerization catalyst. The application of the adhesive may be by way of brush or beading directly onto the surface 12 from the adhesive container nozzle. The adhesive is not applied to the treated first surface 10 because it would cause the polymerization process to begin prematurely. Thereafter, in step 170, the first and second surfaces 10, 12 are urged together (FIG. 3) in order to initiate the bonding of the first and second surface 10, 12. Ideally, the urging together of the surfaces is performed for 15-20 seconds, allowing the prepped synthetic polymer surface(s), the polymerization catalyst, and the surface insensitive adhesive to rapidly work synergistically together to form a strong, permanent bond.

Thereafter, in step 180, heat is applied to warm the seam 14 formed between the first and second surface 10, 12, thereby further sealing and strengthening the resulting bond between the first and second surface 10, 12, thereby bonding the objects together (FIG. 3). This additional heat maintains the increased distance and increased action of the polymer substrate allowing for the maximum number of bonds to form.

Optionally, but not critical to the above method 100, in step 190, the bonded surfaces are allowed to cure for approximately 7-30 days in order to realize the strongest bond—further providing strength and resilience. However, it will be known that the resulting bond is at operational strength—able to handle normal wear and tear—immediately after the bonding process.

It has been determined through testing that the above fast-acting polymerization process provides the strongest resulting bonds. The combination of the above steps and materials provide a superior bond within a minute of urging the surfaces together, which is unexpected and superior to any other bonding process known.

Polymers are greatly diverse which can impact the Polymer Bonding Process described above. For example, sulfone polymers such as polyphenylsulfone (PPSU) need every step of the process, polymer preparation, use of the polymerization catalyst, heat and the surface insensitive structural cyanoacrylate in order to generate a bond. Omit the heat and a very weak glue joint is formed. With another type of polymer, Fluorosilicone (FVMQ) the heat step may not be required in order for a bond to form. While not strictly needed in every application, heat, in every case will produce a stronger bond.

The present application may further comprise a kit for producing a permanent bond between a synthetic polymer first surface and a substrate second surface. Generally, the kit comprises a quantity of synthetic polymer preparation solution; a quantity of a polymerization catalyst; a quantity of surface insensitive cyanoacrylate structural adhesive; and instructions to use the synthetic polymer preparation solution, a polymerization catalyst, and the surface insensitive cyanoacrylate structural adhesive and heat to produce the permanent bond between the synthetic polymer first surface and the substrate second surface.

The instructions contained in the kit may comprise instructions similar to the method 100 outlined above which comprise the following: a) apply the synthetic polymer preparation solution to the synthetic polymer first surface and, if the second substrate second surface is a synthetic polymer, to the substrate second surface; b) allow the applied synthetic polymer preparation solution to dry on each applied surface; c) apply the polymerization catalyst to the synthetic polymer first surface; d) allowing the applied polymerization catalyst to dry on the synthetic polymer first surface; e) applying heat to warm the surfaces made of synthetic polymers until surface temperatures reach between about 114°-120° Fahrenheit; f) apply the surface insensitive cyanoacrylate structural adhesive to the second surface; g) urge contact between the first surface and the second surface; and h) apply heat to warm the seam formed between the first and second surface.

Referring specifically now to FIG. 4-FIG. 15, the present application further provides patch application methods 200, 300 and 400 for sealing a fractured or broken synthetic polymer or non-polymer substrate surface, such as a pipe, tank, or other container. The patch application methods 200, 300, and 400 generally utilize a strip of a synthetic polymer defining a patch which is adhered over a discontinuity and onto the substrate surface in a permanent manner. The synthetic polymer patch 20 is generally impervious or highly resistant to fuel, oil, water, chemicals, and weather. The synthetic polymer patch 20 as utilized in the patch application methods 200, 300, and 400 have many useful applications—and may be utilized to fix or patch most synthetic polymer and non-polymer surfaces including PVC, copper, galvanized steel, cast iron, and plastics. Generally, through research and testing, the synthetic polymer patch 20 as applied in methods 200, 300, and 400 may withstand pressurized contents of up to 240 PSI before failing.

Figure 4:
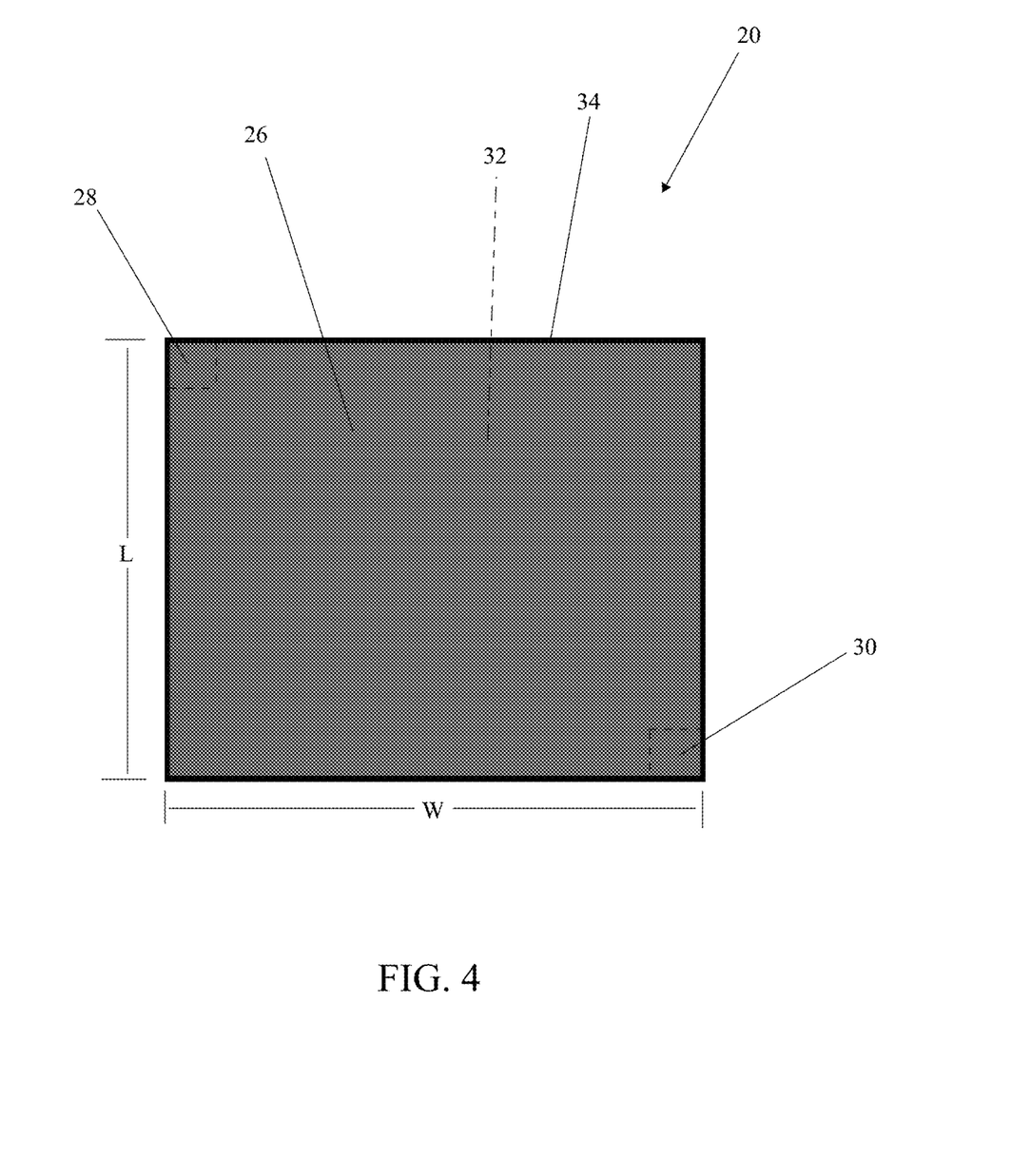
FIG. 4 is a plan view of an example polymer patch.
Figure 5:
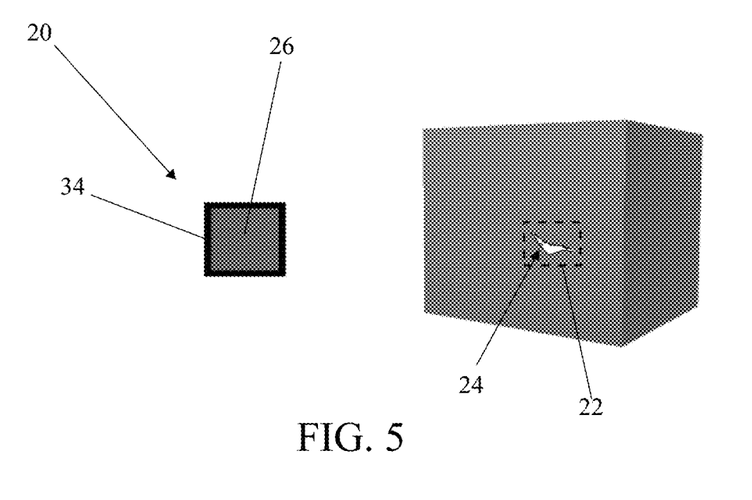
FIG. 5 is an illustrative perspective view providing an example of a polymer patch apart from a polymer substrate surface.
Figure 6:
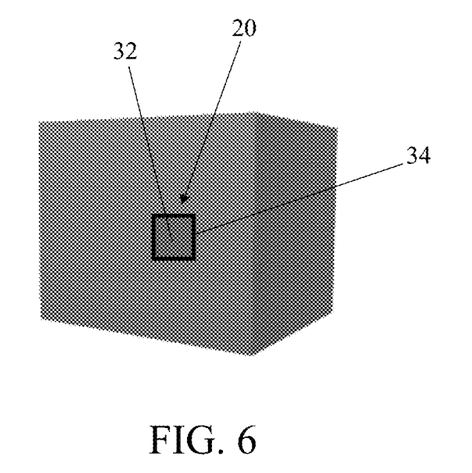
FIG. 6 is an illustrative perspective view of the polymer patch and the polymer substrate surface shown in FIG. 5 bonded together.

As shown in FIG. 4, the patch 20 is generally a thin strip of a synthetic polymer material having sufficient dimensions to overlay a substrate surface comprising a discontinuity, break, or fracture 24. Thus, the size, shape, and dimension of each patch 20 may vary for each specific application. However, preferably, the patch 20 is defined in a rectangular shape having a length L and a width W providing a wide range of coverage. Preferably, the size of the patch is sufficient of overlay and form a boundary which is at least one inch around the discontinuity, break, or fracture 24 of the substrate surface 22.

Preferably, the patch is manufactured of fluorosilicone (FVMQ) which is highly resistant to both chemicals and weather. Fluorosilicone is the polymer of choice for high-stress environments and applications. During the manufacturing process of fluorosilicone, the surface of fluorosilicone is infused with polyfluoroalkyl substances which further improves the imperviable nature of the fluorosilicone. Due to these properties, the patches 20 made of fluorosilicone have excellent fuel, oil, water, and weather resistant properties, along with excellent chemical resistance for most common chemicals. Further, fluorosilicone has a service temperature range from −50 degrees F. to 200 degrees F. which is ideal for outdoor applications.

In some applications, it is ideal to abrade at least one side of a patch 20 which has been treated with polyfluoroalkyl substances, leaving behind a surface that has improved adhesion characteristics, which improves the overall strength of the patches during application as utilized in methods 200, 300, and 400. The unabraded surfaces of the patches generally visually provide a glossy finish while the abraded surfaces visually provide a matte finish. Preferably, during application of the patch 20, the abraded side or interior application surface 26 of the patch 20 is utilized to adhere to the substrate surface 22 and the unabraded side or exterior surface 32 of the patch is exposed outward, providing a barrier resistant to fuel, oil, weather, etc.

Referring now to FIG. 4-FIG. 7, the method 200 generally defines the application of the polymer patch 20 for adhering to and sealing over a fractured or broken polymer substrate surface 22, for example, a synthetic polymer such as a plastic pipe or a plastic container.

Figure 7:
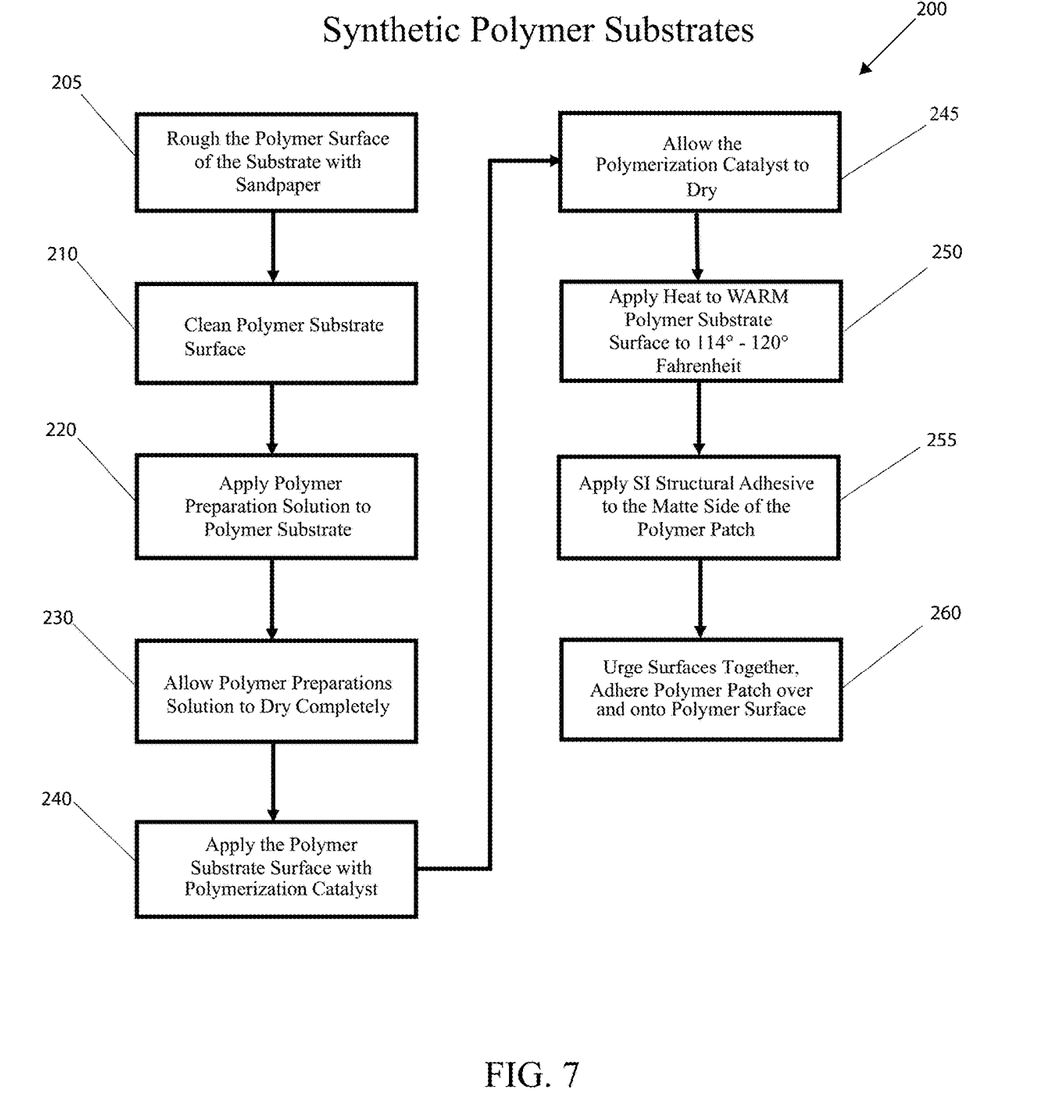
FIG. 7 is a flowchart of a version of the method of patching a polymer substrate surface by producing a bond between a polymer patch surface and the polymer substrate surface shown in FIG. 5 and FIG. 6.
Figure 8:
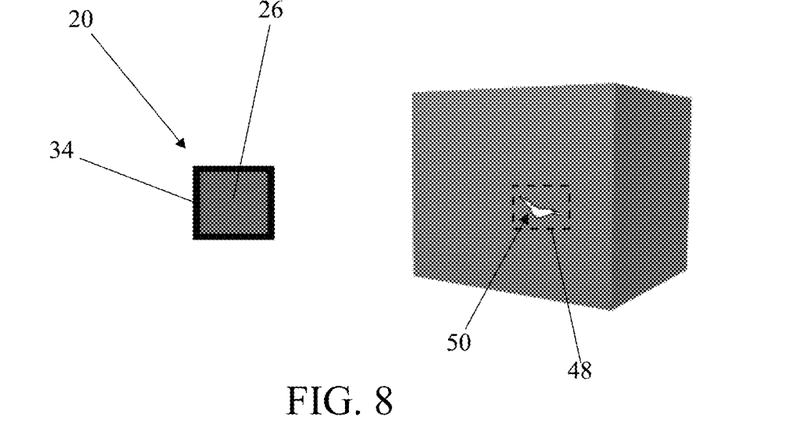
FIG. 8 is an illustrative perspective view providing an example of a polymer patch apart from a non-polymer substrate surface.
Figure 9:
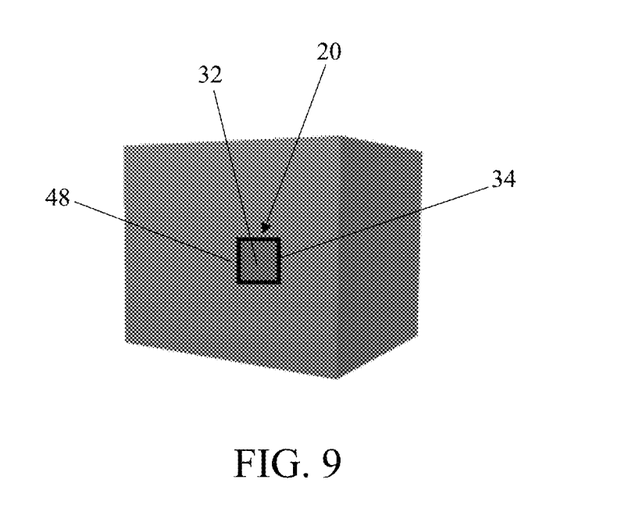
FIG. 9 is an illustrative perspective view of the polymer patch as bonded to the non-polymer substrate surface of the version shown in FIG. 8.

The method 200 of patching a polymer substrate surface by producing a bond between the polymer patch 20 and the polymer substrate surface 22 generally comprises the steps of: a) roughing the polymer substrate surface 22 (Step 205); b) cleaning the polymer substrate surface 22 (Step 210); c) applying a synthetic polymer preparation solution to the polymer substrate surface 22 (Step 220); d) allowing the applied synthetic polymer preparation solution to dry (Step 230); e) applying a polymerization catalyst to the polymer substrate surface 22 (Activator/Accelerator) (Step 240); f) allowing the applied polymerization catalyst to dry (Step 245); g) applying heat to warm the polymer substrate surface 22 until surface temperatures reach between about 114°-120° Fahrenheit (Step 250); h) applying a surface insensitive cyanoacrylate structural adhesive to the synthetic polymer patch 20 application surface 26 (Step 255); and i) urging contact between the synthetic polymer patch 20 application surface 26 and the polymer substrate surface 22 (Step 260), thereby adhering the synthetic polymer patch 20 over the discontinuity 24 and bonding with the polymer substrate surface 22.

In Step 205, the polymer substrate surface 22 around the discontinuity 24 is roughed by way of a means for roughing, for example, sandpaper. Preferably, a fine to medium grade sandpaper is used to rough or make the substrate surface 22 uneven about the substrate discontinuity 24. Thereafter, in Step 210, the synthetic polymer substrate surface 22 is cleaned in order to reduce quantities of foreign substances that could contaminate or mitigate the bonding process, preferably, with a cloth and mild cleaner—wiping the surfaces to remove any dirt, grime, and/or residue.

Referring to Step 220, the synthetic polymer preparation solution is applied to and around the polymer substrate surface 22 discontinuity 24. The synthetic polymer preparation solution can be applied by way of spray bottle, brush, or even dipping the object surface into the solution. Thereafter, the polymer substrate surface 22 is allowed to completely dry (Step 230).

Thereafter, in Step 240, the polymerization catalyst is applied to the polymer substrate surface 22. The polymerization catalyst can be applied by way of spray bottle, brush, or even dipping the subject surface into the solution. Once the polymer substrate surface 22 is completely saturated with the polymerization catalyst, the polymer substrate surface 22 is allowed to dry (Step 245).

Thereafter, in Step 250, heat is evenly applied to warm the polymer substrate surface 22 until surface temperatures preferably reach 114°-120°, more preferably about 118°. The application of heat can be provided by a means for heating such as a blow dryer or heat gun. The application of heat primes the polymer substrate surface 22 for the application of the SI adhesive and the bonding process at the molecular level.

Referring to Step 255, a cyanoacrylate structural adhesive, preferably a fast-active surface insensitive cyanoacrylate structural adhesive is applied to the application surface 26 of the synthetic polymer patch 20 which has not been treated with the polymerization catalyst. The application of the adhesive may be by way of brush or beading directly onto the application surface 26.

Preferably, the SI adhesive is applied to the synthetic polymer patch 20 application surface 26 in a continuous loop or circular pattern covering the entire application surface 26 except for small fingertip sized surfaces adjacent to selected opposing diagonal corners 28, 30, assuming that the synthetic polymer patch 20 is rectangular in dimension. Preferably, additional adhesive is applied to the synthetic polymer patch 20 application surface 26 where it is likely to contact the discontinuity 24 of the polymer substrate surface 22. If the synthetic polymer patch 20 is not rectangular, then opposing fingertip sized surfaces can be positioned at the synthetic polymer patch 20 outer perimeter 34.

Thereafter, in step 260, the synthetic polymer patch 20 application surface 26 and the polymer substrate surface 22 are urged together (FIG. 6) in order to initiate the bonding of the application surface 26 or polymer patch surface and the polymer substrate surface 22 near the discontinuity 24.

Preferably, the diagonal corners 28, 30 that lack adhesive are utilized as grab points, namely, the corners 28, 30 are grabbed by hand, gently stretching the polymer patch 20 while simultaneously applying the application surface 26 to the polymer substrate surface 22. Ideally, the urging together of the surfaces 22, 26 is performed for 15-20 seconds, allowing the prepped synthetic polymer substrate surface 22, the polymerization catalyst, and the surface insensitive adhesive to rapidly work synergistically together to form a strong, permanent bond.

Preferably, a glue squeegee or putty knife is utilized to apply firm pressure working from the interior of the polymer patch 20 exterior surface 32 to the outer perimeter 34 thereof. Further, adhesive is applied to the opposing diagonal corners 28, 30 of the application surface 26 that lack adhesive. Thereafter, each of the diagonal corners 28, 30 are urged towards the polymer substrate surface 22 in order to complete the seal.

Thereafter, the synthetic polymer patch 20 is inspected to assure that there is continual contact between the patch 20 application surface 26 and the polymer substrate surface 22, particularly at the outer perimeter 34 of the synthetic polymer patch 20. In certain instances, multiple patches 20 may be fabricated to overlap previously attached patches 20 in order to assure that the discontinuity 24 is completely sealed.

Optionally, it is recommended that adhesive is applied along the complete outer perimeter 34 of the polymer patch 20. Thereafter, the polymerization catalyst is applied to the synthetic polymer patch 20 outer perimeter 34.

Lastly, the patch 20 and polymer substrate surface 22 are visually inspected for any discontinuities, breaks, or gaps around the outer perimeter 34 of the polymer patch 20, indicating that the patch 20 may allow a leak. If a discontinuity is discovered, more adhesive should be applied and the polymerization catalyst applied thereafter until a complete seal is achieved.

The present application may further comprise a kit for patching a polymer substrate surface by producing a bond between a polymer patch surface and the polymer substrate surface. Generally, the kit may include a polymer patch providing a polymer patch surface, a means for roughing such as a quantity of sandpaper; a quantity of synthetic polymer preparation solution; a quantity of a polymerization catalyst; a quantity of surface insensitive cyanoacrylate structural adhesive; and a glue squeegee (or putty knife). The kit may further include instructions to use the polymer patch, means for roughing, synthetic polymer preparation solution, a polymerization catalyst, the surface insensitive cyanoacrylate structural adhesive, glue squeegee and heat to produce a bond between the polymer patch surface and the polymer substrate surface.

The instructions contained in the kit may comprise instructions similar to the method 200 outlined above which may comprise the following: roughing the polymer substrate surface with the means for roughing; cleaning the polymer substrate surface; applying an amount of synthetic polymer preparation solution to the polymer substrate surface; allowing the applied synthetic polymer preparation solution to dry; applying an amount of polymerization catalyst to the polymer substrate surface; allowing the applied polymerization catalyst to dry; applying heat to warm the polymer substrate surface until surface temperatures reach between about 114°-120° Fahrenheit; applying an amount of surface insensitive cyanoacrylate structural adhesive to the polymer patch surface; and urging contact between the polymer patch surface and the polymer substrate surface by utilizing the glue squeegee.

Referring specifically now to FIG. 4, FIG. 8-FIG. 10, the present application further provides the method 300 for patching or sealing over a discontinuity 50 in a non-polymer substrate surface 48, such as copper, galvanized steel, cast iron, etc. Ideally, a thin-layered synthetic polymer patch 20, preferably manufactured of fluorosilicone is utilized to adhere over the discontinuity 50 and onto the non-polymer substrate surface 48 surrounding the discontinuity 50. Research and testing have shown that the application of the synthetic polymer patch 20 as it relates to the attachment to non-polymer substrates can resist up to 120 PSI before the patch fails.

Figure 10:
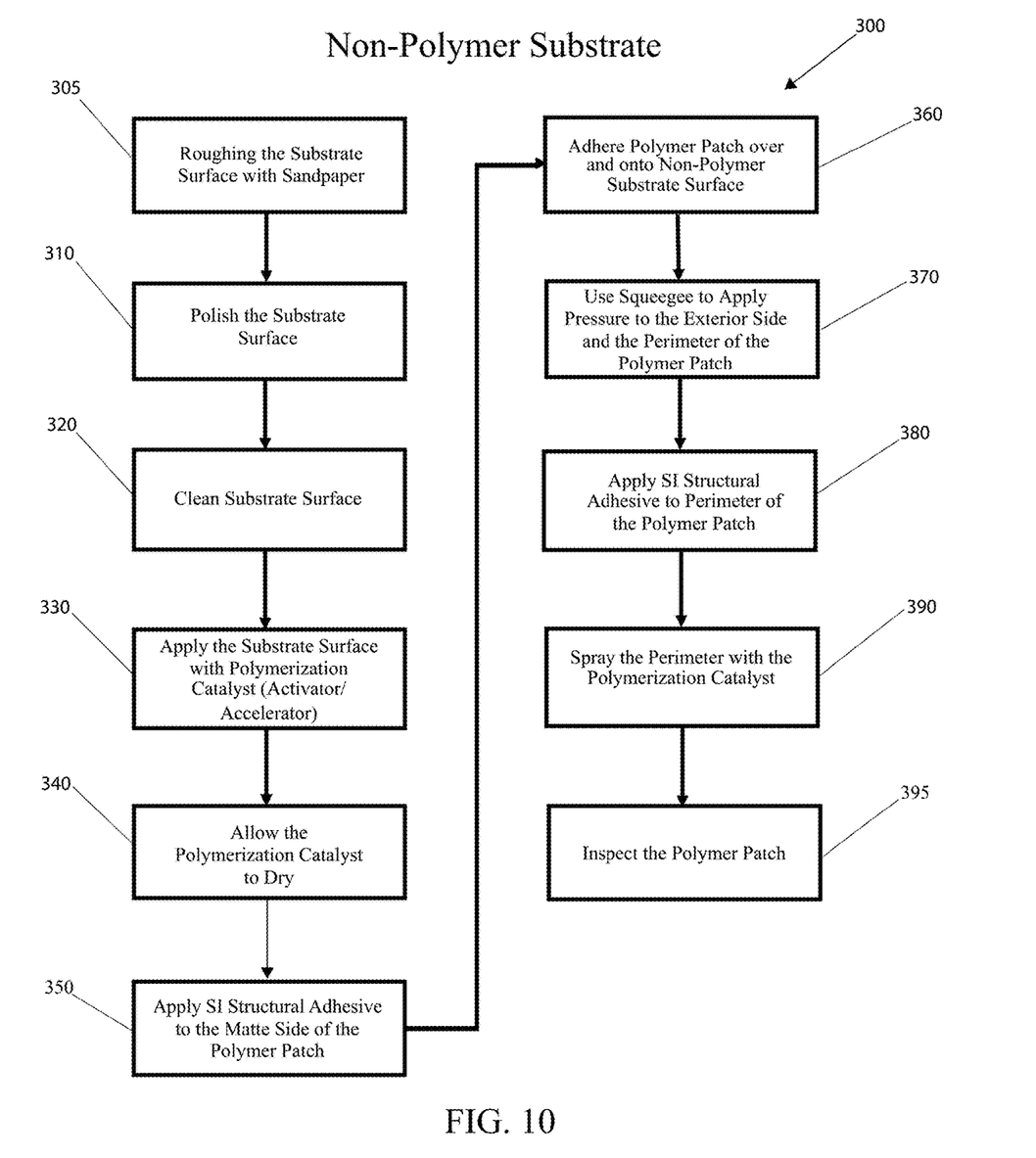
FIG. 10 is a flowchart of a version of the method of patching a polymer substrate surface by producing a bond between a polymer patch surface and the non-polymer substrate surface as shown in FIG. 8 and FIG. 9.

As shown in FIG. 10, the method 300 generally comprises the steps of: a) roughing the non-polymer substrate surface (Step 305); b) polishing the non-polymer substrate surface (Step 310); c) cleaning the non-polymer substrate surface (Step 320); c) applying a polymerization catalyst to the non-polymer substrate surface (Step 330); d) allowing the applied polymerization catalyst to dry (Step 340); e) applying a surface insensitive cyanoacrylate structural adhesive to the polymer patch surface (Step 350); and f) urging contact between the polymer patch surface and the substrate surface (Step 360).

The method 300 starts with Step 305, wherein the area around the discontinuity 50 in the non-polymer substrate surface 48 is roughed by a means for roughing. Preferably, the means for roughing is a course grade sandpaper which is used to aggressively rough or make the surface uneven about the non-polymer substrate surface 48 discontinuity 50. Further, the edges of the discontinuity 50 should be roughed to adequately remove corrosion if present.

Thereafter, in Step 310, a fine to medium grade sandpaper, preferably 400 to 600 grit, is utilized to polish the non-polymer substrate surface 48, for example, in order to polish copper, metal, cast iron, etc. If the non-polymer substrate surface 48 is steel, polishing is ideally achieved by way of sandblasting or other means of polishing.

Thereafter, the non-polymer substrate surface 48 is cleaned in order to reduce quantities of foreign substances that could contaminate or mitigate the bonding process, preferably, with a cloth and mild cleaner—wiping the surfaces to remove any dirt, grime, and/or residue. Any residual water on the surface is allowed to completely dry.

In step 330, a polymerization catalyst is applied to the non-polymer substrate surface 48. Once the non-polymer substrate surface 48 is completely saturated with the polymerization catalyst, the non-polymer substrate surface 48 is allowed to dry (Step 340).

Referring to step 350 in FIG. 10, a cyanoacrylate structural adhesive, preferably a fast-active surface insensitive cyanoacrylate structural adhesive is applied to the application surface 26 of the synthetic polymer patch 20. The application of the adhesive may be by way of brush or beading directly onto the surface 26 from the adhesive container nozzle. Preferably, the adhesive is applied to the polymer patch 20 application surface 26 in a continuous loop or circular pattern covering the entire surface 26. Preferably, adhesive is not applied to two opposing fingertip size diagonal corners 28, 30. Preferably, additional adhesive is applied to the patch 20 application surface 26 where it is likely to contact the discontinuity 50 of the non-polymer substrate surface 48.

Thereafter, in step 360, the patch 20 application surface 26 and the non-polymer substrate surface 48 are urged together (FIG. 9) in order to initiate the bonding of the patch 20 application surface 26 and the non-polymer substrate surface 48 near the discontinuity 50. In further detail, preferably, the diagonal corners 28, 30 (FIG. 4) that lack adhesive are utilized as grab points, namely, the corners 28, 30 are grabbed by hand, gently stretching the patch 20 while simultaneously applying the patch 20 application surface 26 to the non-polymer substrate surface 48. Ideally, the urging together of the application surface 26 and non-polymer substrate surface 48 is performed for 15-20 seconds, allowing the non-polymer substrate surface 48, the polymerization catalyst, and the surface insensitive adhesive to rapidly work synergistically together to form a strong, permanent bond.

Preferably, thereafter in Step 370, a glue squeegee or putty knife is utilized to apply firm pressure working from the interior of the synthetic polymer patch 20 exterior surface 32 to the outer perimeter 34 thereof. Further, adhesive is applied to the opposing diagonal corners 28, 30 surfaces that lack adhesive. Thereafter, each of the diagonal corners 28, 30 are urged towards the non-polymer substrate surface 48 in order to complete the seal.

Thereafter, the synthetic polymer patch 20 is inspected to assure that there is continual contact between the patch 20 application surface 26 and the non-polymer substrate surface 48, particularly at the perimeter 34 of the synthetic polymer patch 20. In certain instances, multiple patches 20 may be fabricated to overlap previously attached patches 20 in order to assure that the discontinuity 50 is completely sealed.

Optionally, in Step 380, it is recommended that adhesive is applied along the complete outer perimeter 34 of the synthetic polymer patch 20 extending to the surrounding non-polymer substrate surface 48. Thereafter, in Step 390, the polymerization catalyst is applied to the synthetic polymer patch 20 outer perimeter 34 and surrounding non-polymer substrate surface 48.

Lastly, in Step 395, the synthetic polymer patch 20 and non-polymer substrate surface 48 are visually inspected for any discontinuities, breaks, or gaps around the outer perimeter 34 of the synthetic polymer patch 20, indicating that the patch 20 may allow a leak. If a discontinuity is discovered, more adhesive should be applied and the polymerization catalyst applied thereafter until a complete seal is achieved.

The present application may further comprise a kit for patching a non-polymer substrate surface by producing a bond between a polymer patch surface and the non-polymer substrate surface. Generally, the kit may include a polymer patch providing a polymer patch surface, a means for roughing such as a quantity of sandpaper; a means for polishing such as a fine grade sandpaper; a quantity of a polymerization catalyst; a quantity of surface insensitive cyanoacrylate structural adhesive; and a glue squeegee. The kit may include instructions to use the polymer patch, synthetic polymer preparation solution, a polymerization catalyst, the surface insensitive cyanoacrylate structural adhesive, and glue squeegee to produce a bond between the polymer patch surface and the non-polymer substrate surface.

The instructions contained in the kit may comprise instructions similar to the method 300 outlined above which may comprise the following: roughing the non-polymer substrate surface with the means for roughing; polishing the non-polymer substrate surface with the means for polishing; cleaning the non-polymer substrate surface; applying an amount of polymerization catalyst to the non-polymer substrate surface; allowing the applied polymerization catalyst to dry; applying an amount of surface insensitive cyanoacrylate structural adhesive to the polymer patch surface; and urging contact between the polymer patch surface and the non-polymer substrate surface by utilizing the glue squeegee.

Referring specifically now to FIG. 4, FIG. 11-FIG. 15, the present application further provides a method 400 for patching or sealing over a discontinuity 54 in a non-polymer substrate 52 such as copper, galvanized steel, cast iron, etc. In method 400, a thin-layered synthetic polymer patch 20, preferably manufactured of fluorosilicone is utilized to adhere over the discontinuity 54 and onto the non-polymer substrate surface 52. Unique to method 400, an additional thin layer of an intermediate reinforcement substrate 36, preferably a metal foil or a piece of cloth tape is utilized and positioned between the synthetic polymer patch 20 and the non-polymer substrate surface 52 in order to achieve improved structural integrity of up to 240 PSI before the patch 20 fails.

Figure 11:
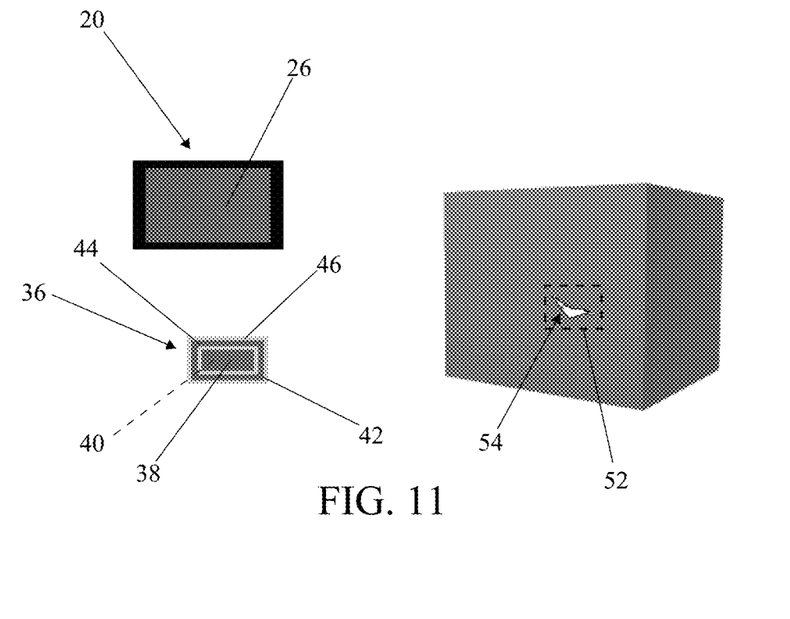
FIG. 11 is an illustrative perspective view providing an example of a polymer patch and intermediate reinforcement substrate apart from a non-polymer substrate surface.
Figure 12:
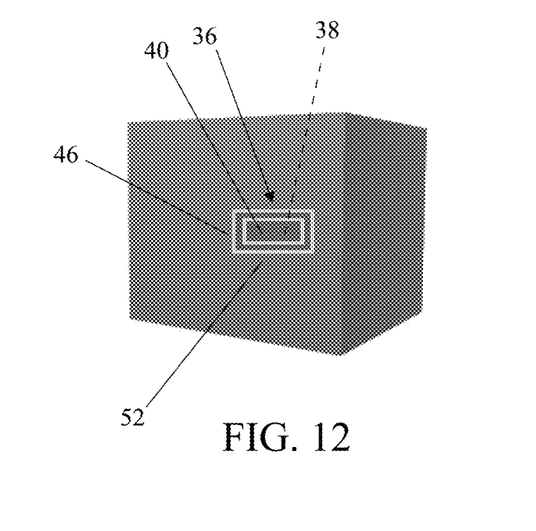
FIG. 12 is an illustrative perspective view of the intermediate reinforcement substrate as bonded to the non-polymer substrate surface of the version shown in FIG. 11.

The intermediate reinforcement substrate 36 is generally a thin piece of material which is positioned between the polymer patch 20 and the non-polymer substrate surface 52 in order to provide more structural reinforcement to the affixation of the polymer patch 20 onto the non-polymer substrate surface 52. Preferably, the intermediate reinforcement substrate 36 is either a strip of porous cloth material or a metal foil. Ideally, the strip of porous cloth is similar to surgical adhesive tape which provides a porous material made of cotton which is ready to absorb SI adhesive. The use of a strip of porous cloth as the intermediate reinforcement substrate 36 is beneficial because it absorbs the application of the SI adhesive, and after the SI adhesive cures within the pours of the cloth, a strong and durable reinforcement of the polymer patch 20 results.

The thin piece of metal or metal foil can preferably be manufactured of copper, tin, aluminum, gold, etc. Preferably, the thickness of the intermediate reinforcement substrate 36 is between 10 mil to 20 mil, most preferably, about 10 mil. In the application, the intermediate reinforcement substrate 36 provides a rectangular dimension, preferably having dimension which are less than the rectangular dimensions of the polymer patch 20 and great enough to surround the discontinuity 54 within the non-polymer substrate surface 52.

Figure 14:
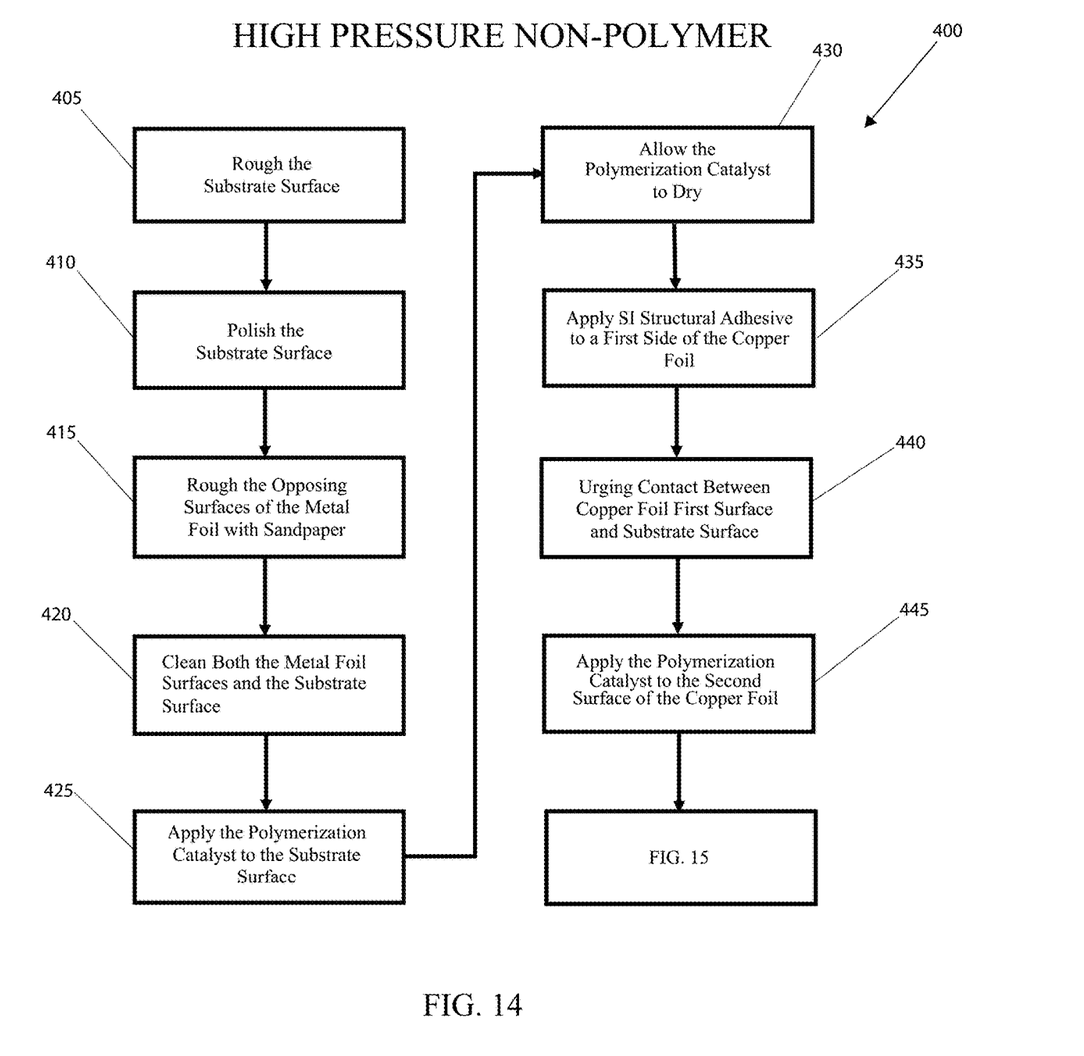
FIG. 14 is a flowchart of a version of the method of patching a non-polymer substrate surface by producing a bond between a polymer patch surface, an intermediate reinforcement substrate, and a non-polymer substrate surface as shown in FIG. 11-FIG. 13.
Figure 15:
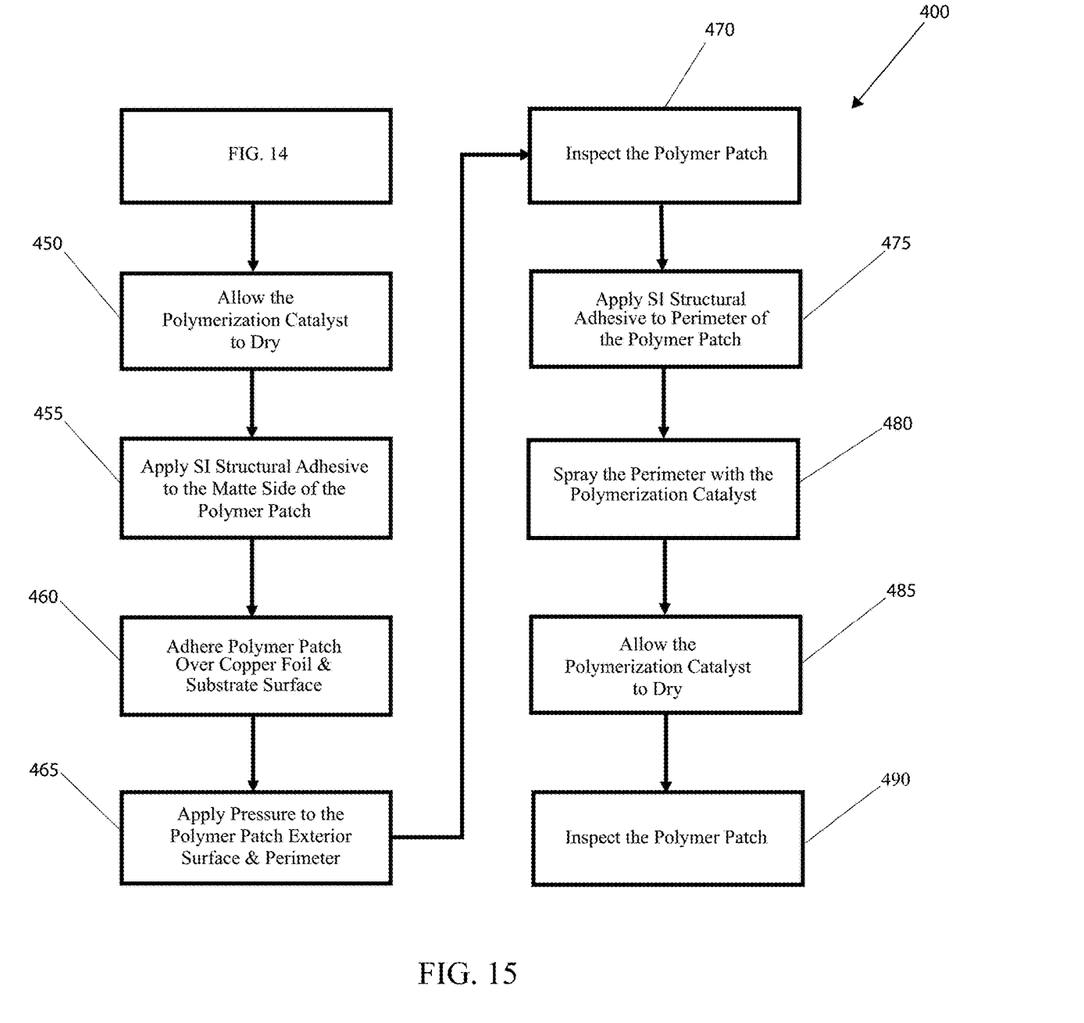
FIG. 15 is a continuation of the FIG. 14 flowchart.

The method 400 generally comprises the steps of: a) roughing the non-polymer substrate surface 52 (Step 405); b) polishing the non-polymer substrate surface 52 (Step 410); c) roughing the opposing surfaces 38, 40 of the intermediate reinforcement substrate 36 (Step 415); d) cleaning the non-polymer substrate surface 52, the first surface 38 of the intermediate reinforcement substrate 36, and the second surface 40 of the intermediate reinforcement substrate 36 (Step 420); e) applying a polymerization catalyst to the non-polymer substrate surface 52 (Step 425); f) allowing the applied polymerization catalyst to dry (Step 430); g) applying a surface insensitive cyanoacrylate structural adhesive to the intermediate reinforcement substrate 36 first surface 38 (Step 435); h) urging contact between the intermediate reinforcement substrate 36 first surface 38 and the non-polymer substrate surface 52 (Step 440); i) applying a polymerization catalyst to the intermediate reinforcement substrate 36 second surface 40 (Step 445); j) allowing the applied polymerization catalyst to dry (Step 450); k) applying a surface insensitive cyanoacrylate structural adhesive to the polymer patch 20 application surface 26 (Step 455); and l) urging contact between the polymer patch 20 application surface 26, the intermediate reinforcement substrate 36 second surface 40, and the exposed surrounding non-polymer substrate surface 52 surrounding the intermediate reinforcement substrate 36 second surface 40, thereby adhering the polymer patch 20 over the intermediate reinforcement substrate 36 and surrounding exposed non-polymer substrate surface 52 (Step 460).

With reference to FIG. 14, the method 400 starts with Step 405, wherein the area around the discontinuity 54 in the non-polymer substrate surface 22 is roughed by way of a means for roughing. Preferably, a course grade sandpaper is used to aggressively rough or make the surface uneven about the non-polymer substrate surface 52 discontinuity 54. Further, the edges of the discontinuity 54 should be roughed to adequately remove corrosion if present.

Thereafter, in Step 410, a fine to medium grade sandpaper, preferably 400 to 600 grit, is utilized to polish the non-polymer substrate surface 52, for example, copper, metal, cast iron, etc. If the non-polymer substrate surface 52 is steel, polishing is ideally achieved by way of sandblasting or other means of polishing.

In Step 415, each of the first surface 38 and the second surface 40 of the intermediate reinforcement substrate 36 are roughed, preferably by the use of sandpaper or other roughing means.

Thereafter, in Step 420, both sides of the intermediate reinforcement substrate 36 or metal foil surfaces and the non-polymer substrate surface 52 are cleaned in order to reduce quantities of foreign substances that could contaminate or mitigate the bonding process, preferably, with a cloth and mild cleaner—wiping the surfaces to remove any dirt, grime, and/or residue. Any residual water on the surface is allowed to completely dry.

Thereafter, in step 425, the polymerization catalyst is applied to the non-polymer substrate surface 52. Once the non-polymer substrate surface 52 is completely saturated with the polymerization catalyst, the non-polymer substrate surface 52 is allowed to completely dry (Step 430).

Referring to step 435 in FIG. 14, a cyanoacrylate structural adhesive, preferably a fast-active surface insensitive cyanoacrylate structural adhesive is applied to the first surface 38 of the intermediate reinforcement substrate 36. The application of the adhesive may be by way of brush or beading directly onto the first surface 38 from the adhesive container nozzle. Preferably, the adhesive is applied in a continuous loop or circular pattern covering the entire first surface 38. Preferably, adhesive is selectively not applied to two opposing diagonal corners 42, 44. Preferably, additional adhesive is applied to the intermediate reinforcement substrate 36 first surface 38 where it will likely contact the discontinuity 54 of the non-polymer substrate surface 52.

Thereafter, in step 440, the first surface 38 of the intermediate reinforcement substrate 36 and the non-polymer substrate surface 52 are urged together (FIG. 12) in order to initiate the bonding of the intermediate reinforcement substrate 36 first surface 38 and the non-polymer substrate surface 52 near the discontinuity 54. In further detail, preferably, the diagonal corners 42, 44 that lack adhesive are utilized as grab points, namely, the corners 42, 44 are grabbed by hand, gently providing the intermediate reinforcement substrate 36 under tension while simultaneously applying the intermediate reinforcement substrate 36 first surface 38 to the non-polymer substrate surface 52. Ideally, the urging together of the surfaces is performed for 15-20 seconds.

Preferably, a glue squeegee or putty knife is utilized to apply a firm pressure working from the interior of the intermediate reinforcement substrate 36 second surface 40 to the outer perimeter 46 thereof. Thereafter, the intermediate reinforcement substrate 36 is inspected to assure that there is continual contact between the intermediate reinforcement substrate 36 first surface 38 and the substrate surface 22, particularly at the outer perimeter 46 thereof. Adhesive is applied to the opposing diagonal corners 42, 44 of the intermediate reinforcement substrate 36 first surface 38 that lack adhesive. Each of the diagonal corners 42, 44 are urged towards the non-polymer substrate surface 52 in order to complete the seal.

Thereafter, in step 445, the polymerization catalyst is applied to the second surface 40 of the intermediate reinforcement substrate 36 and the surrounding non-polymer substrate surface 52. The polymerization catalyst can be applied by way of spray bottle, brush, etc. Once the intermediate reinforcement substrate 36 second surface 40 is completely saturated with the polymerization catalyst, the second surface 40 is allowed to completely dry (Step 450).

Referring to step 455 in FIG. 15, a cyanoacrylate structural adhesive, preferably a fast-active surface insensitive cyanoacrylate structural adhesive is applied to the application surface 26 of the synthetic polymer patch 20. The application of the adhesive may be by way of brush or beading directly onto the surface 26 from the adhesive container nozzle. Preferably, the adhesive is applied to the polymer patch 20 application surface 26 in a continuous loop or circular pattern covering the entire application surface 26. Preferably, adhesive is selectively not applied to two opposing diagonal corners 28, 30 (FIG. 4).

Figure 13:
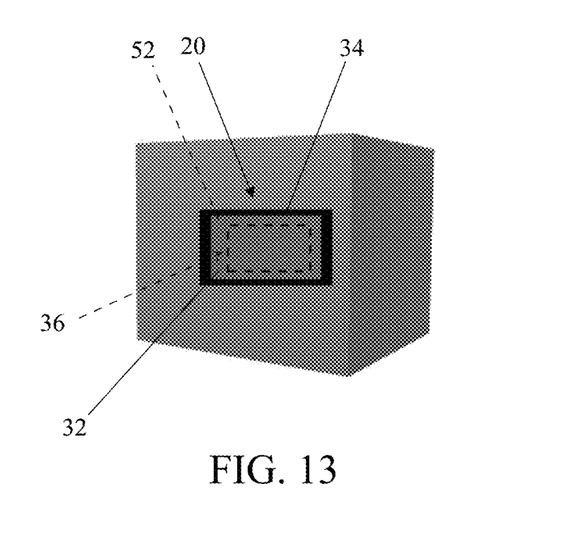
FIG. 13 is an illustrative perspective view of the polymer patch bonded to the intermediate reinforcement substrate and non-polymer substrate surface of the version shown in FIG. 11 and FIG. 12.

Thereafter, in step 460, the patch 20 application surface 26, the intermediate reinforcement substrate 36 second surface 40, and the exposed surrounding non-polymer substrate surface 52 are urged together (FIG. 13). The urging together of surfaces initiates the bonding of the patch 20 application surface 26 with over the intermediate reinforcement substrate 36 second surface 40 and surrounding exposed non-polymer substrate surface 52. In further detail, preferably, the diagonal corners 28, 30 that lack adhesive are utilized as grab points, namely, the corners 28, 30 are grabbed by hand, gently stretching the patch 20 while simultaneously applying the patch 20 application surface 26 to the intermediate reinforcement substrate 36 second surface 40 and the non-polymer substrate surface 52. Ideally, the urging together of the surfaces 52, 26, and 40 is performed for 15-20 seconds, allowing the prepped non-polymer substrate surface 52, the polymerization catalyst, and the surface insensitive adhesive to rapidly work synergistically together to form a strong, permanent bond.

Preferably thereafter in Step 465, a glue squeegee or putty knife is utilized to apply firm pressure working from the interior of the synthetic polymer patch 20 exterior surface 32 to the outer perimeter 34 thereof. Further, adhesive is applied to the opposing diagonal corners 28, 30 surfaces that lack adhesive. Thereafter, each of the diagonal corners 28, 30 are urged towards the non-polymer substrate surface 52 in order to complete the seal.

In Step 470, the synthetic polymer patch 20 is inspected to assure that there is continual contact between the patch 20 application surface 26 and the non-polymer substrate surface 52, particularly at the outer perimeter 34 of the synthetic polymer patch 20. In certain instances, multiple patches 20 may be fabricated to overlap previously attached patches 20 in order to assure that the discontinuity 54 is completely sealed.

Optionally, in Step 475, it is recommended that adhesive is applied along the complete outer perimeter 34 of the synthetic polymer patch 20. Thereafter, in Step 480, a polymerization catalyst is applied to the adhesive at the outer perimeter 34 of the synthetic polymer patch 20 and allowed to dry (Step 485).

Lastly, in Step 490, the synthetic polymer patch 20 and non-polymer substrate surface 52 are visually inspected for any discontinuities, breaks, or gaps around the outer perimeter 34 of the synthetic polymer patch 20, indicating that the patch 20 may allow a leak. If a discontinuity is discovered, more adhesive should be applied and the polymerization catalyst applied thereafter until a complete seal is achieved.

The present application may further comprise a kit for patching a non-polymer substrate surface by producing a bond between a polymer patch surface, an intermediate reinforcement substrate having a first surface and a second surface, and a non-polymer substrate surface. Generally, the kit may include a polymer patch providing a polymer patch surface, a piece of intermediate reinforcement substrate, a means for roughing such as a quantity of sandpaper; a means for polishing such as a fine grade sandpaper; a quantity of a polymerization catalyst; a quantity of surface insensitive cyanoacrylate structural adhesive; and a glue squeegee. The kit may include instructions to use the polymer patch, intermediate reinforcement substrate, synthetic polymer preparation solution, a polymerization catalyst, the surface insensitive cyanoacrylate structural adhesive, means for roughing, means for polishing, and glue squeegee to produce a bond between the polymer patch surface, intermediate reinforcement substrate, and the non-polymer substrate surface.

The instructions contained in the kit may comprise instructions similar to the method 400 outlined above which may comprise the following: roughing the non-polymer substrate surface with the means for roughing; polishing the non-polymer substrate surface with the means for polishing; roughing the first surface and the second surface of the intermediate reinforcement substrate with the means for roughing; cleaning the non-polymer substrate surface, the first surface of the intermediate reinforcement substrate, and the second surface of the intermediate reinforcement substrate; applying an amount of the polymerization catalyst to the non-polymer substrate surface; allowing the applied polymerization catalyst applied to the non-polymer substrate surface to dry; applying an amount of the surface insensitive cyanoacrylate structural adhesive to the intermediate reinforcement substrate first surface; urging contact between the intermediate reinforcement substrate first surface and the non-polymer substrate surface by utilizing the glue squeegee; applying an amount of the polymerization catalyst to the intermediate reinforcement substrate second surface; allowing the applied polymerization catalyst applied to the intermediate reinforcement substrate second surface to dry; applying an amount of surface insensitive cyanoacrylate structural adhesive to the polymer patch surface; urging contact between the polymer patch surface and the intermediate reinforcement substrate second surface and the exposed non-polymer substrate surface by utilizing the glue squeegee.

Preferably, the bonds formed between the polymer patch 20 and the respective substrates as described by method 200, 300, and 400 are allowed to cure for at least twenty-four hours.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. A method of patching a polymer substrate surface by producing a bond between a polymer patch surface and the polymer substrate surface, the method comprising the steps of:
    roughing the polymer substrate surface;
    cleaning the polymer substrate surface;
    applying a synthetic polymer preparation solution to the polymer substrate surface;
    allowing the applied synthetic polymer preparation solution to dry;
    applying a polymerization catalyst to the polymer substrate surface;
    allowing the applied polymerization catalyst to dry;
    applying heat to warm the polymer substrate surface until surface temperatures reach between about 114°-120° Fahrenheit;
    applying a surface insensitive cyanoacrylate structural adhesive to the polymer patch surface; and
    urging contact between the polymer patch surface and the polymer substrate surface;
    wherein the polymer patch surface is manufactured of fluorosilicone;
    wherein the polymer patch surface has been treated with polyfluoroalkyl substances and abraded providing a matte finish.

* * * * *